INVENTORS
R. A. Prange
and
S. Krasnow
BY Paris, Haskell & Levine
ATTORNEYS

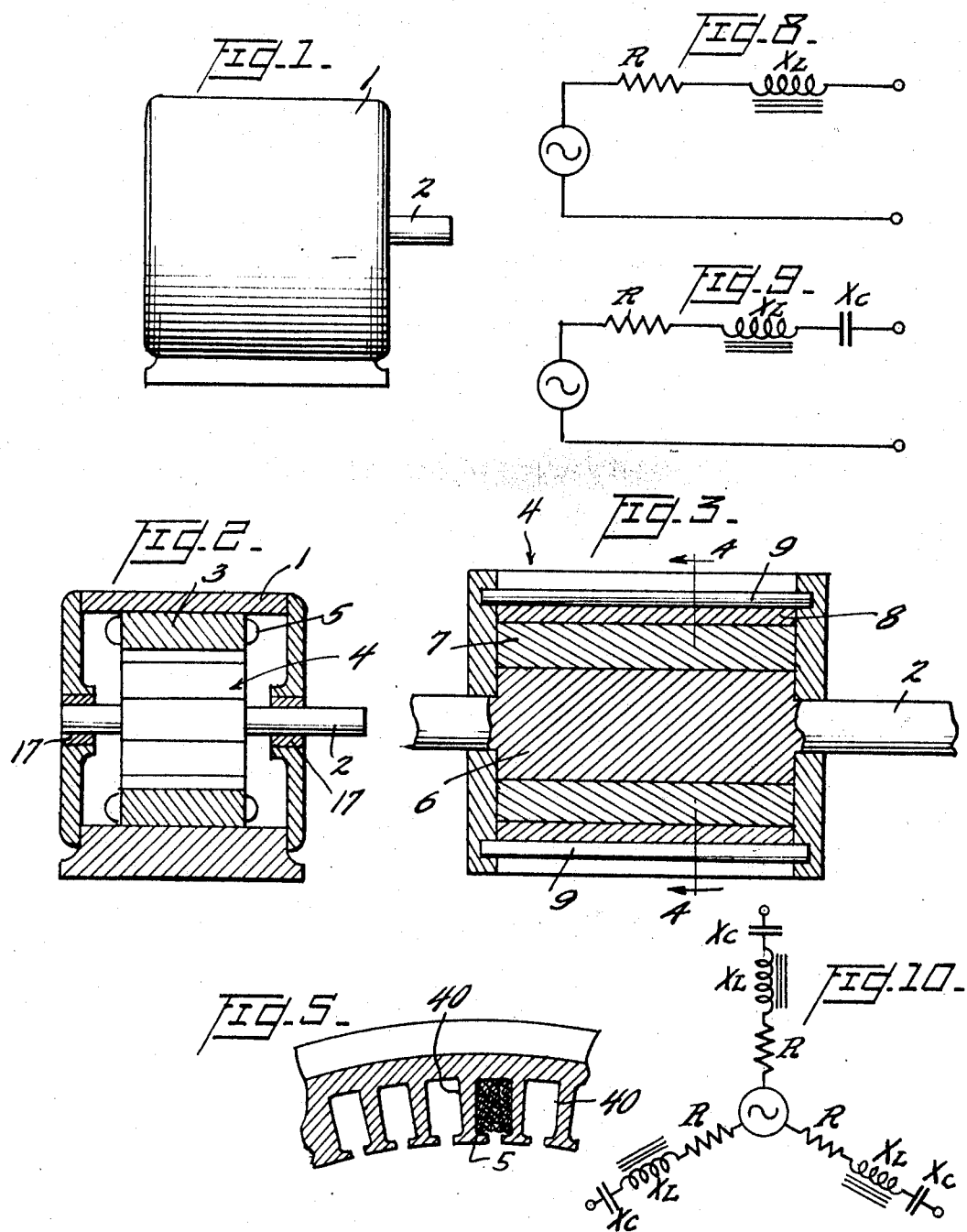

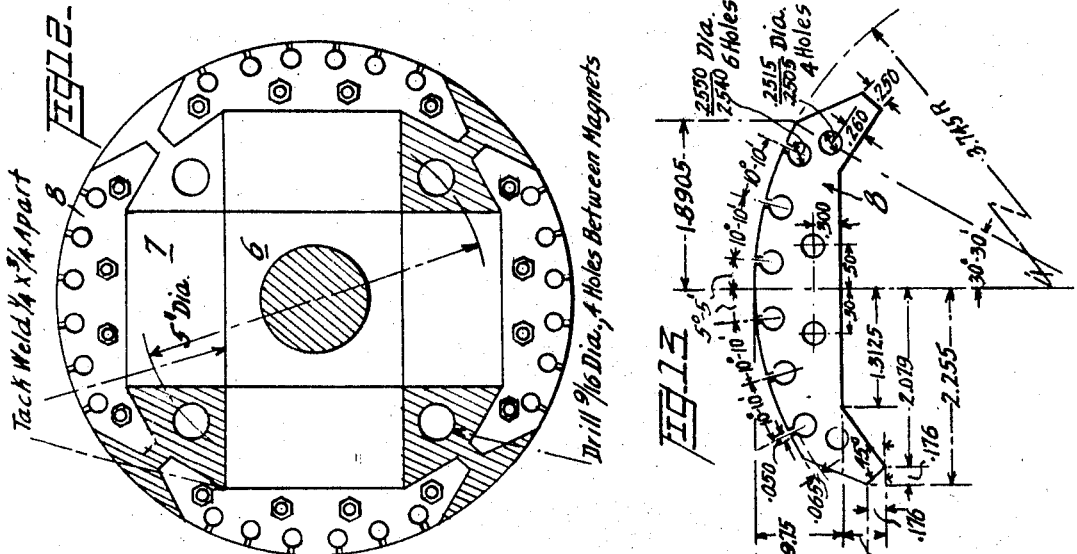
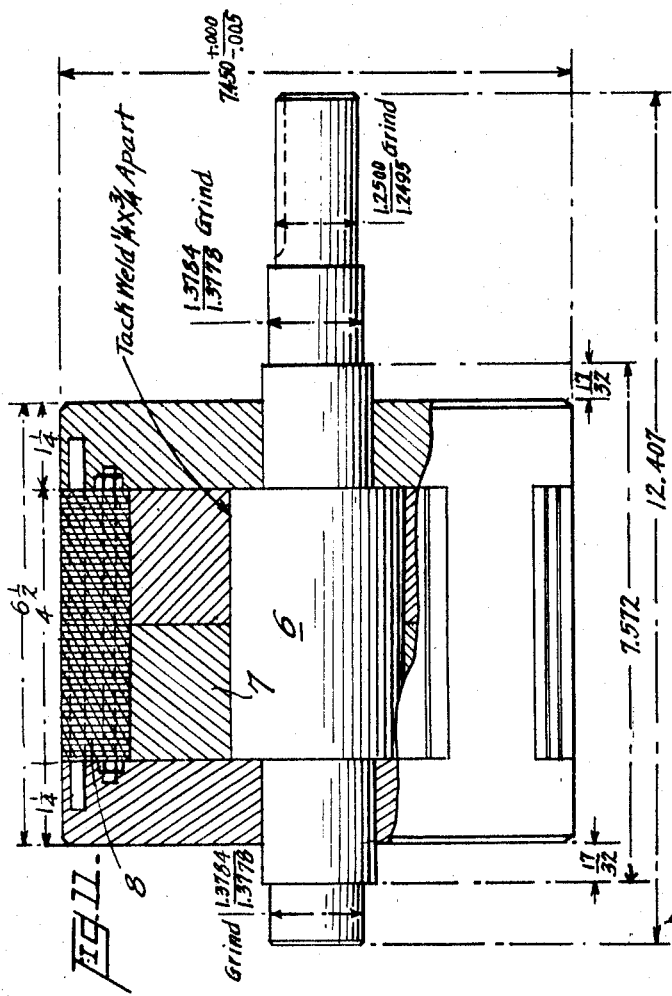
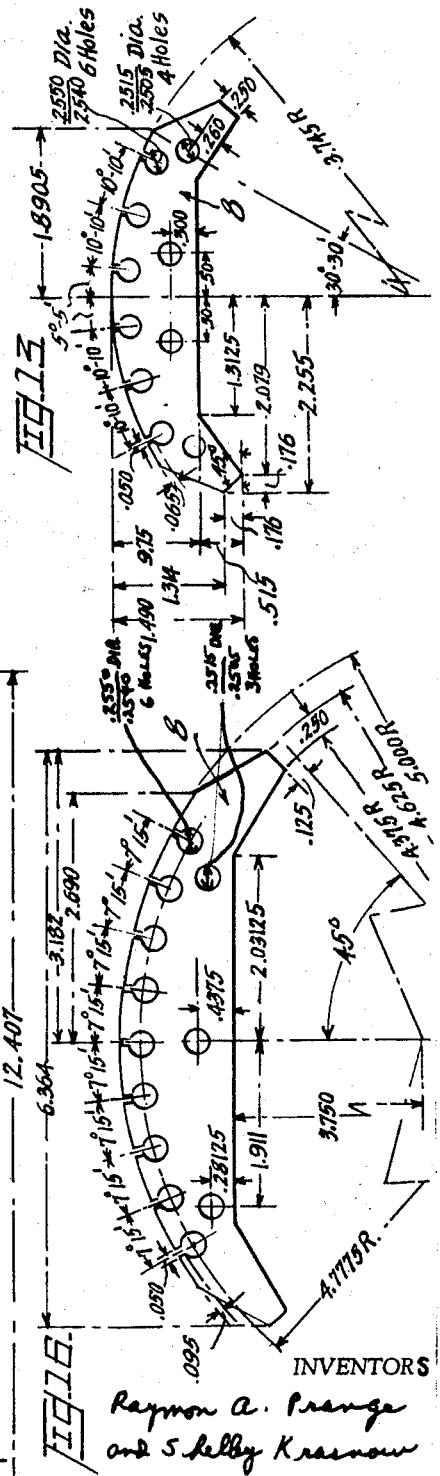
INVENTORS
Raymon A. Prange
and Shelby Krasnow
BY Paris, Haskell & Levine
ATTORNEYS

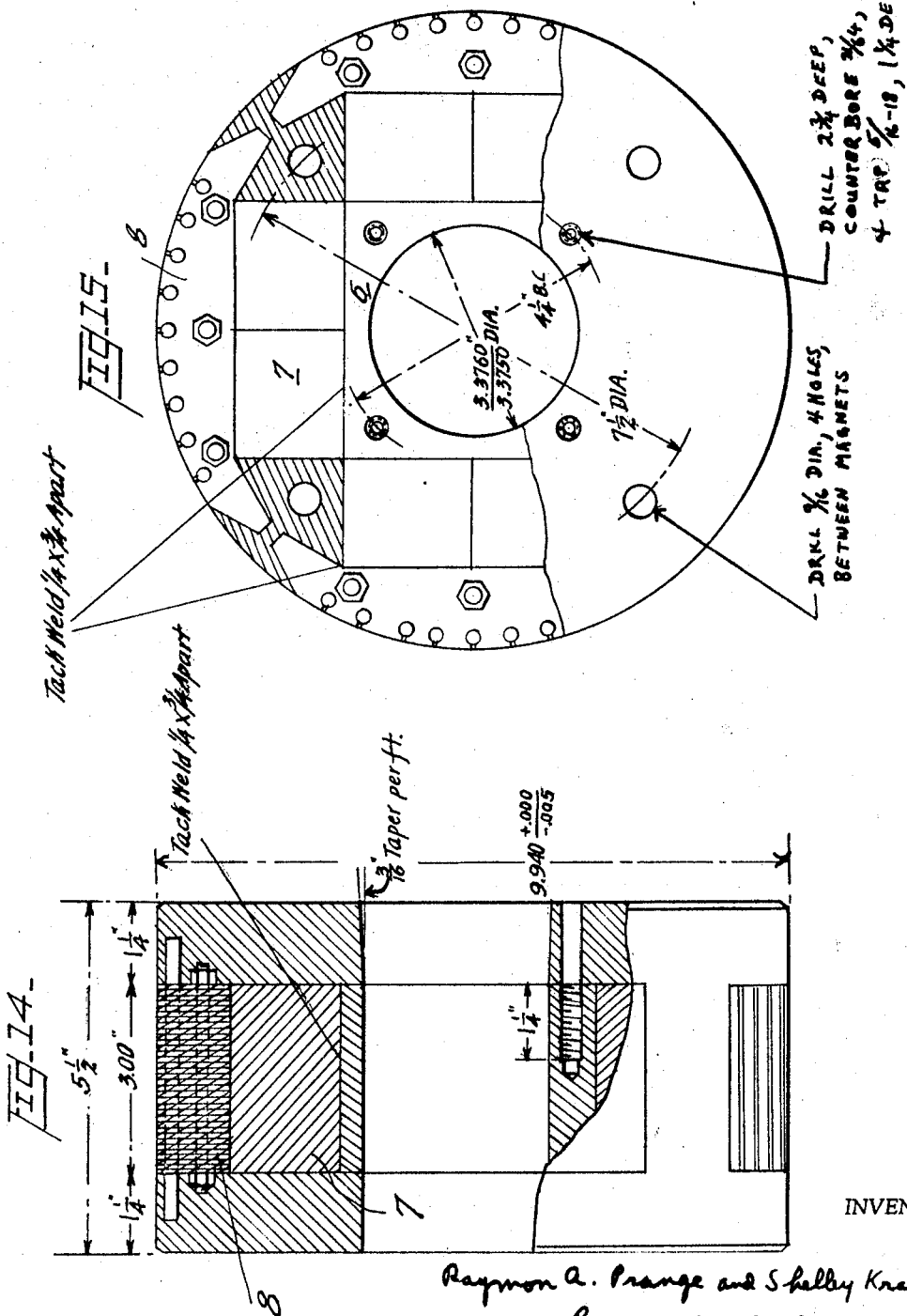

3,445,700
DYNAMO-ELECTRIC MACHINE
Raymon A. Prange, Washington, D.C., and Shelley Krasnow, Fairfax, Va., assignors to Georator Corporation, a corporation of Virginia
Continuation-in-part of application Ser. No. 435,403, Feb. 16, 1965. This application Jan. 9, 1967, Ser. No. 613,985
Int. Cl. H02k 21/12
U.S. Cl. 310—156                                    13 Claims

ABSTRACT OF THE DISCLOSURE

A permanent magnet generator provides zero or negative regulation over most of its rated capacity without the use of external regulation devices. Regulation is believed to be accomplished by the relationship of magnetic flux paths in the internal design of the machine.

---

The present invention relates to permanent magnet dynamo-electric machines, and is described herein with specific reference to dynamo-electric generators. In particular the present invention is concerned with the regulation characteristics of such generators, i.e. with the characteristics of such generators to decrease their output voltage in reponse to an increase in load. It is the purpose of the present invention to minimize this regulation characteristic in permanent magnet generators, and even to provide such generators which have substantially zero regulation over the rated capacity of the machine, and where desired to provide even a negative regulation whereby the voltage output of the generator is increased in response to an increase in the load over at least a portion of the rated capacity of the machine.

The majority of devices designed to utilize electric power require a relatively constant voltage for proper operation. Since the amount of power required by such devices may vary in their normal operation and since the number of such devices applied as a load against a generator may also vary, it is desirable that the generator have characteristics enabling it to deliver a constant output voltage, regardless of the load applied, so long as the load remains within the rated capacity of the generator. An ideal generator would, therefore, have the characteristic of providing a constant output voltage over the entire load range up to the full load capacity for which the generator is designed. After this, it is desirable that the output voltage drop off rapidly with each increment of load above the normal rating of the machine, so that at short circuit the current passing through the machine will be limited, to limit or avoid damage. This ideal operating characteristic within the normal load range is herein referred to as zero regulation.

In prior art generators utilizing external excitation, the above-described theoretically desirable performance has been attained by the use of regulating devices controlling the excitation in proportion to the external load. These external devices involve, in most cases, a sacrifice of simplicity and the provision of systems which might have adverse effects under certain circumstances. For example: there is a tendency for hunting if the regulating device is made too sensitive; there tend to be voltage overshoots and undershoots on sudden changes in load and on overload; and there is a tendency on the part of the regulator to increase excitation greatly, in an attempt to hold the voltage despite an overload. On occasion this characteristic of an external regulator results in damage to the generator.

In prior art generators utilizing permanent magnet excitation, application of a load to the unregulated generator always involved a drop in terminal output voltage, for reasons that will be more fully described subsequently. To obviate this difficulty, particularly in instances where the drop in voltage is greater than can be tolerated by the load, external regulating devices have been devised, sensitive to voltage changes and responsive thereto. As an alternate to this, still other expedients have been applied, involving auxiliary windings, voltage monitoring devices and systems designed to pass varying currents through the auxiliary windings in response to load conditions. These expedients involve costly variations in the generator, requiring multiple windings, and in some cases require increased external dimensions of the machine. One of the greatest advantages of the permanent magnet machine, namely simplicity of construction and ruggedness, is therefore sacrificed when these external regulating devices are utilized.

Generators made according to the present invention, however, approach very closely the ideal performance of zero regulation; this characteristic is obtained by appropriate internal magnetic design of the generator, and is not dependent upon external regulating devices, or auxiliary windings, or voltage monitoring devices. In addition, generators can be designed in accordance with the present invention which provide an increase in output voltage with application of load, i.e., a negative regulation characteristic. The negative regulation characteristic possesses particular advantages in applications where the generator output power is fed through a long line resulting in a voltage drop due to the resistance of the line itself. With a generator voltage that rises with load, the line drop is compensated automatically, to deliver a relatively constant voltage at the end of the line. This superior performance obtained with a generator made according to the instant invention is attained by appropriate design of the fixed internal magnetic parameters of the generator.

It is accordingly one object of the present invention to provide a dynamo-electric machine having improved regulation characteristics.

Another object of the present invention is to provide such a machine having substantially zero or negative regulation characteristics.

Still another object of the present invention is to provide a permanent magnet dynamo-electric generator having substantially zero or negative regulation characteristics.

A still further object of the present invention is to provide a magnet structure for a permanent magnet dynamo-electric generator providing substantially zero or negative regulation characteristics for the generator.

Other objects and advantages of the present invention will become apparent to those skilled in the art from a consideration of the following detailed description of exemplary specific embodiments of the invention, had in conjunction with the accompanying drawings, in which like numerals refer to like or corresponding parts, and wherein:

FIG. 1 is an external elevational view of a generator embodying the present invention;

FIG. 2 is a vertical axial sectional view of the generator of FIG. 1;

FIG. 3 is an enlarged axial sectional view of the rotor only of the generator of FIGS. 1 and 2;

FIG. 5 is a fragmentary cross sectional view of a portion of the stator of the generator of FIGS. 1 and 2;

FIG. 7 is an other graph similar to that of FIG. 6 showing the actual results obtained with a second embodiment of a generator constructed according to the present invention, providing a negative regulation characteristic;

Figure 6:
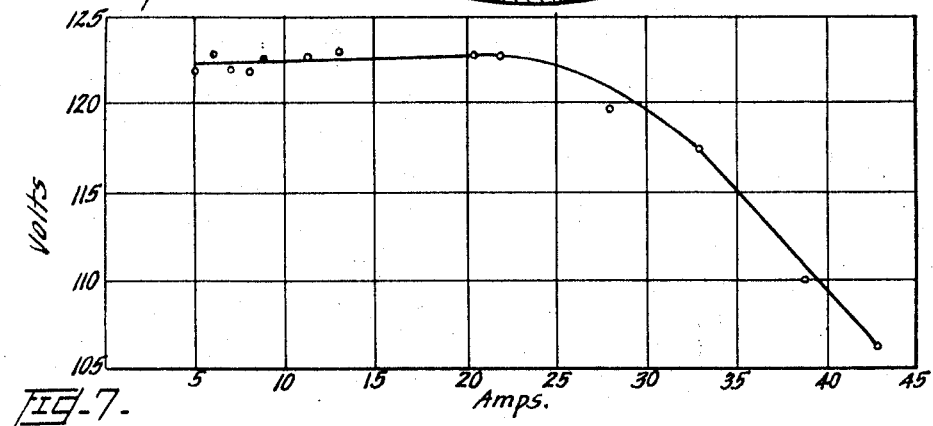
FIG. 6 is a graph plotting output volts against amperes and representing the results actually obtained with a first embodiment of a generator constructed according to the present invention, providing substantially zero regulation over the rated capacity of the generator.
Figure 7:
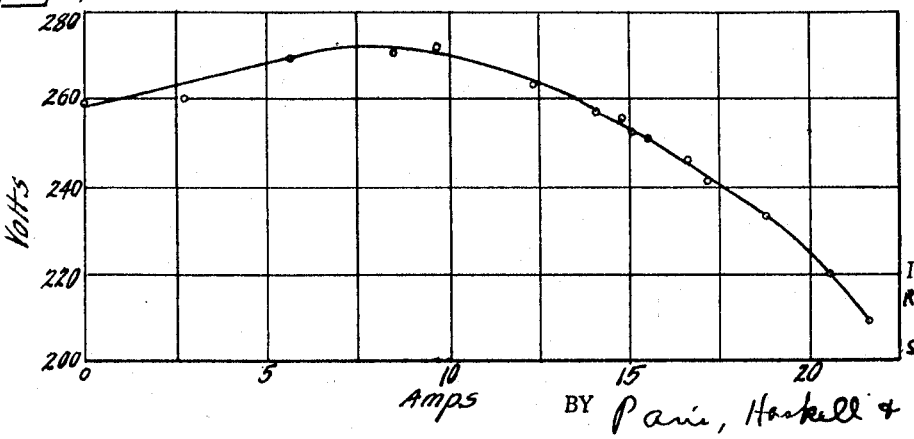

FIG. 8 is an equivalent circuit diagram of a conventional permanent magnet generator;

FIGS. 9 and 10 are equivalent circuit diagrams of a permanent magnet generator in accordance with the present invention;

FIGS. 11, 12 and 13 are dimensional drawings of the rotor structure of said first embodiment, having the regulation characteristic shown in FIG. 6, wherein FIG. 11 is an axial sectional view, FIG. 12 is a cross-sectional view, and FIG. 13 is a detail plan view of one pole piece lamination; and FIGS. 14, 15 and 16 are dimensional drawings of the rotor structure of said second embodiment, having the regulation characteristic shown in FIG. 7, wherein FIG. 14 is an axial sectional view, FIG. 15 is a cross-sectional view, and FIG. 16 is a detail plan view of one pole piece lamination.

By way of theoretical analysis of the regulation problem, an equivalent diagram of a usual permanent magnet generator is presented in FIG. 8. The reason for a drop in output voltage with an increase in load in a permanent magnet generator, is the inherent internal resistance (R) and inductive reactance ($X_L$). When a load current (I) is drawn from the terminals of the generator, there is a drop ($V_\Delta$) in the terminal or output voltage (V) due to the internal resistance and inductive reactance. This drop is according to the conventional formula $$V_\Delta = IR + \frac{(IX_L)^2}{2V}$$

It has heretofore appeared impossible to construct a machine with a zero value for R or $X_L$, and it has therefore been considered impossible for an unregulated machine to deliver a constant voltage over a wide range of load variations. The reason for the drop in voltage is not entirely due to the presence of literal resistance or inductance. Another important and sometimes dominant factor is the weakening of the excitation field flux, due to the armature reaction. Since the voltage generated by the generator at constant speed is directly proportional to the value of the exciting flux, any diminution in flux due to the armature reaction will cause a consequent drop in output voltage. This weakening of field flux mimics the effect of a series connected inductance.

In the present invention, regulation improvement is achieved by the structure of the magnetic flux producing member, which is so designed that the total exciting field flux does not diminish appreciably, or does not diminish at all with increasing load (zero regulation), and in some cases, actually increases with load to yield a higher generated voltage for the loaded than for the unloaded condition (negative regulation), over a substantial portion of the rated operational load capacity of the machine. By way of a suggested theory of operation, if the simulation of a capacitance can be attained, the effect will be to neutralize, partially, completely, or more than completely, the inductive reactance of the generator. Accordingly, it is believed that the generator design of the present invention provides an apparent internal capacitive reactance ($X_C$) of a value sufficiently great not merely to neutralize the inductive reactance ($X_L$), but to increase the excitation sufficiently to overcome the drop caused by the internal resistance (R). It is well known that in permanent magnet machines, the connection of an external capacitor has the effect of increasing the excitation, thereby tending to increase the terminal voltage. The apparent internal capacitive reactance that seems to be provided by the present invention appears to be equivalent to an external capacitance connected between the load and the generator. FIG. 9 is an equivalent circuit diagram for a single phase of a generator exhibiting this apparent internal capacitance, and FIG. 10 is an equivalent circuit diagram for three phases.

Figure 4:
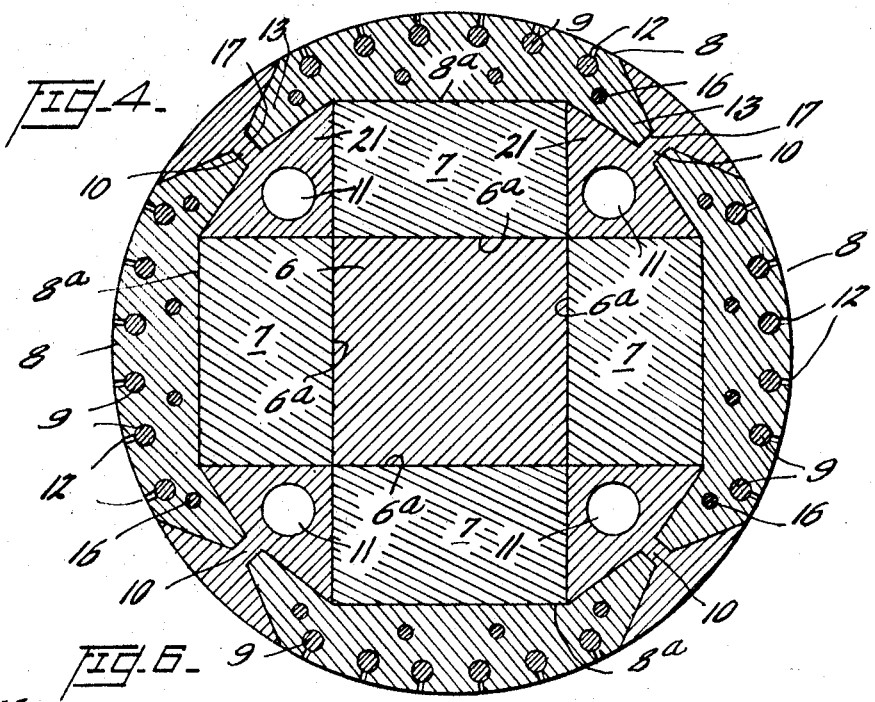
FIG. 4 is a cross sectional view of the rotor, taken on line 4—4 of FIG. 3.

The internal capacitance effect mentioned herein is thought to be achieved by the configuration of the magnetic circuit. If reference is made particularly to FIG. 4 of the drawings, it will be noted that the pole pieces 8 of the rotor 4 each have three surfaces from which the magnetic flux tends to emanate. One of these is the arcuate working surface, which delivers magnetic flux radially into the air gap between the rotor 4 and stator 3 and ultimately into the stator. This is the actual working flux. There are, in addition, dual diverted flux paths for each pole piece, wherein flux passes across the leakage gaps 10 between the juxtaposed end faces 17 of adjacent pole pieces. It is the configuration of the leakage gaps, specifically shown in precise detail in FIGS. 11–16, that is thought to be particularly significant in attaining the zero and negative regulation characteristics of the present invention. Under no-load conditions, when the rotor is rotating at synchronous speed and the machine is on open circuit, equilibrium is established between the portion of the flux emanating from the arcuate surfaces of the pole pieces, known as the working flux, and that from the pole piece end faces being bypassed from one pole to the adjacent one without performing useful work in the working air gap. This equilibrium condition will inherently be disturbed as soon as a load is applied to the machine. If the load is at unity power factor, as described herein, the armature reaction will cause the flux to be shifted tangentially, which causes a crowding of the flux at each lagging pole piece end face 17, and weakens the flux at each leading pole piece end face 17. In other words, there is a tendency to crowd flux toward one end of each pole piece, which results in a greater magneto-motive force being manifested tangentially at that leakage gap, in turn tending to drive more flux across that leakage gap. However, since the end configurations of the pole pieces at the leakage gaps are of limited cross-sectional area, and moreover have sharp edges, any attempt to pass more flux therethrough will result in a partial saturation of the structure at the leakage gap faces. This will tend to increase the reluctance at the leakage gaps and shift the equilibrium between working flux and leakage flux, so that the total working flux is greater than it was under the no-load condition. Since the terminal voltage is directly dependent upon the working flux, the voltage will tend to rise on application of the load.

Fundamentally, what has been provided is a rotating permanent magnet dynamo-electric structure with alternate leakage and working paths for the magnetic flux, and means by which, under the influence of the armature reaction, the proportion of working flux is increased as against its value under the no-load condition, due to a resultant increase in the magnetic reluctance of the leakage path. The increase in working flux, as taught herein, may be only great enough to overcome the voltage drop due to other causes and thus achieve zero regulation, or it may be greater than that required to overcome other factors and thus lead to a voltage which rises on application of load. Since the described action of the rotor system is dependent upon and proportional to the armature reaction, which is in turn proportional to the load, the entire function is automatic and requires no other auxiliary equipment or auxiliary structure to achieve the desired results.

With particular reference to FIGS. 1–5, the generator of the present invention has an external housing 1 and a projecting central shaft 2. The shaft 2 is an extension of the internal permanent magnet rotor 4 which is journaled in bearings 17. The rotor is, therefore, free to rotate about its axis but is restrained against movement along the axis. A stator 3 surrounds the rotor 4 and is spaced therefrom with a suitable air gap. The stator 3 is provided with the usual windings 5. The rotor 4 in this specific embodiment is shown for purposes of example as a 4-pole type whose poles are spaced 90° about the rotor axis, designed to deliver a 60 cycle output at 1800 r.p.m.

Rotor 4 is formed on a hub 6 provided with four faces 6a, against each of which lies a permanent magnet 7. Magnets 7 may be any of the standard permanent magnet alloys such as cobalt steel or Alnico. A typical material which has been found to give satisfactory results is Crucible Steel Company Alnico VC, or Alnico VABDG. The magnet material of the type noted has directional magnetic properties and in this case is utilized with the magnetic axis perpendicular to the respective face 6a of the central hub 6. The magnets are preferably provided with ground faces where they make contact with the hub 6 and with the superposed pole pieces 8.

The pole pieces 8 are constructed of a number of laminations stacked together axially along the rotor and secured with steel rivets or bolts 16, pursuant to conventional practices. Although the pole pieces may be made of solid material, the use of laminations facilitates obtaining the shape desired and also reduces losses in the operation of the generator. A typical material for these laminations is motor grade silicon steel, 26 or 29 gauge. The laminae are preferably produced by a punch press blanking operation.

In the outer periphery of the pole pieces 8 and lying in a direction parallel to the axis of the entire rotor are slots and openings 12. The openings have been made cylindrical to facilitate the placing of conducting bars 9 therein. These bars may be made of high conductivity aluminum or copper. They are seen in FIG. 3 to project from the ends of the pole pieces 8. The purpose of the slots and bars is to improve the general performance of the machine. Among the advantages gained are improvement of the wave form when the machine is operated single phase and the damping of unwanted oscillations in rotation of the rotor.

Pole pieces 8 each have a lower flat face portion 8a lying against the outer plane face of its respective magnet 7, and they each have an outer portion of arcuate form to fit within the stator 3 and dimensioned to provide an appropriate air gap there-between, such as about 0.030 inch. At its lateral or circumferential termini, each pole piece 8 is formed with tapers at 13, preferably straight line as shown in the drawing, and turned generally inwardly from the outer circumference of the rotor. These tapered sections 13 terminate in narrow flats 17. A gap 10 is provided between the juxtaposed termini 13 of adjacent pole pieces 8. The correct proportioning of this gap is believed to be of importance in securing the desired zero or negative regulation characteristic of the present invention. Although it would appear that this gap results in the loss of magnetic flux, the net result is advantageous, having a bearing on a number of important characteristics of the machine.

The bars 9, may be interconnected at each end of the rotor by means of a conducting bar welded or brazed thereto. Alternatively they may be allowed to project, making contact ultimately with the adjacent bars through the intermediacy of the cast aluminum which will be described hereinafter.

After preliminary assembly of the hub, magnets, pole pieces, and conducting bars of the rotor, it is placed in a mold which is then filled with molten aluminum. After the aluminum has cooled, the rotor is machined to final cylindrical form and to the correct diameter, pursuant to conventional procedures for completing the rotor assembly. Balancing holes 11 are usually provided in the filled aluminum areas 21. These holes may have lead weights placed therein of the proper size and in the proper location along the rotor axis to effect both static and dynamic balance of the rotor. After assembly, the magnets may be energized by procedures familiar to those versed in this art.

The annular stator structure, being of mechanically conventional design for permanent magnet generators, is shown only in partial detail in FIG. 5. However, as will be readily understood by those skilled in the art, it is formed of laminated thin sheet stock of a suitable steel, such as silicon steel, motor grade. The stator is axially slotted as indicated by numeral 40 to house windings 5, as is conventional in this art. The windings utilized in the preferred modification of the generator utilizing the rotor shown in FIG. 12 are distributed, three phase windings. The stator in this case had 48 slots. The coils were 10 pitch, with four coils per pole per phase. In the modifications utilizing the rotor shown in FIG. 15, the winding was generally of similar design. The stator had 60 slots. The coils were 12 pitch, with five coils per pole per phase. The stator 3 and completed rotor 4 are mounted in the housing 1 to complete the machine.

Since the proper proportioning and relation of the components of the rotor are utilized to achieve zero and negative regulation characteristics of the present invention, dimensional drawings of the rotor 4 and of the pole pieces 8 are presented in FIGS. 11, 12, and 13 for one embodiment of the invention, and in FIGS. 14, 15, and 16 for a second embodiment of the invention. The former is a 3 kva. machine, while the latter is somewhat bigger and is a 6 kva. machine. The dimensions given are in inches and degrees. Although these dimensions are not limiting, and other dimensions may be utilized, those shown have resulted in generators having substantially zero or negative regulation characteristics.

FIG. 6 shows the graph obtained by plotting the output voltage and current values read in an actual test of one generator made according to the invention, and specifically the generator of FIGS. 11, 12, and 13. The load employed for the FIG. 6 run was a resistive load, obtained by utilizing standard electric light bulbs. It will be noted that the voltage remains substantially constant from no load condition up to a load of over 20 amperes. Thereafter, as the load increases the voltage falls off rapidly, thus closely approximating an ideal voltage-current curve. FIG. 7 shows the results of tests on still another machine, made according to the present invention, specifically the generator of FIGS. 14, 15, and 16, providing a negative regulation characteristic. Here it will be noted that the voltage rises slightly on application of load, and remains above the zero load voltage up to a load of about 13 amps, finally beginning to drop in value as the load approaches and is increased beyond the rated capacity of the generator. FIGS. 6 and 7, therefore, represent the attainment of the ideal regulation characteristic in dynamoelectric generators: namely, obtaining a substantially constant or increased voltage over the rated load range of the generator. It should be noted that the results represented in FIGS. 6 and 7 are obtained without any special windings in the stator, without any auxiliary movable elements within the generator or within the rotor structure itself, other than the usual rotation of the generator rotor about its axis. The generator whose operating characteristics are represented in FIG. 6, may, therefore, properly be defined as a zero regulation generator, while the one whose operating characteristics are shown in FIG. 7, may be appropriately characterized as a negative regulation generator.

It has been observed that the zero or negative regulation of the present machines is related to the angle subtended by the arcuate surface of the pole piece 8. For example the angle subtended by the arcuate surface of the pole piece in FIG. 13 is approximately 61°, while that subtended by the arcuate pole piece in FIG. 16 is approximately 72°. Referring to FIGS. 6 and 7 it will be observed that the negative regulation of the generator using the pole piece of FIG. 16 is substantially greater than that using the pole piece of FIG. 13. A similar relationship was observed in other comparative tests. For example, in one generator constructed in the manner herein described, the angle subtended by the arcuate surface of each pole piece was increased from 60½° to 70°. The resultant negative regulation for the same type of load was increased from 5% to 7.5%. By the same token, reduction of the angle subtended by the pole face decreased the negative regulation, down to zero or even into the usual positive realm. Thus, a decrease to a subtended angle of about 57° was sufficient to reduce the negative regulation to about 1½%.

Still another factor involved is that of the slotting of the rotor pole face for the conventional damper bars. It will be noted that applicant's structure utilizes a lesser number of such bars than are conventionally employed. This is one of the reasons for the negative regulation characteristic. Reducing the number still further, or even eliminating them altogether, where the application of the machine permits this, will improve the negative regulation characteristic. In this respect, it is not merely the omission of the damper bars but the filling of the slots with ferro-magnetic material that is of influence.

Thus, for a four pole generator, it is preferred that the angle subtended by the arcuate face portion of each pole piece, be not less than about 60°, and some improvement in regulation characteristics can be obtained at a subtended angle of as low as about 55 to 57°. It is believed that the invention can be equally applied to generators having more than four poles, by using a value for the subtended angle obtained by the expression:

$$\frac{4}{A} \times 60$$

wherein A is the number of poles of the machine, and 60° is the selected angle for a four pole machine.

The construction and advantages shown may be utilized in other types of electromagnetic machines with constant excitation or in those with variable excitation to assist in achieving the desired constancy of voltage or rise in voltage on application of load.

Having thus described the present invention with reference to exemplary specific embodiments thereof, it is understood that these embodiments are presented only as examples to facilitate a complete understanding and provide a complete teaching of the invention. Accordingly, various modifications, changes, and variations of these embodiments will be apparent to those skilled in the art, and such as are within the scope of the appended claims are contemplated as within the purview of the present invention.

What is claimed is:

1. A dynamo-electric generator comprising a first member for producing a magnetic flux, a second member reactive to said flux for producing an electric current, one member being located within the other member, means mounting said two members for relative rotation, the juxtaposed surfaces of said two members being substantially cylindrical in over-all configuration, said first member having a plurality of magnetic pole producing means symmetrically spaced circumferentially thereabout, each said means including a pole piece having a central section directly energized magnetically and two side termini flanking said central section, said termini being tapered substantially uniformly away from said central section and both sides of the taper being turned in a direction generally away from said surface of said second member relative to the corresponding sides of said central section, the adjacent termini of adjacent pole pieces being completely separated from each other by non-magnetic material, the portion of each said pole piece between its said termini having an arcuate surface subtending an angle not less than about 55°, and said generator having means providing an apparent internal capacitive reactance sufficient substantially to neutralize the inductive reactance of the generator and to overcome the internal resistance thereof over a substantial portion of the rated operating capacity of the generator.

2. A dynamo-electric generator as set forth in claim 1, wherein said angle is not less than about 60°.

3. A permanent magnet dynamo-electric machine, comprising a stator and a cylindrical rotor rotationally mounted within said stator, said rotor comprising a hub having a plurality of side surfaces forming a polygon in cross-section, a permanent magnet of substantially rectangular cross-section mounted on each side surface, and a pole piece capping each said magnet, each pole piece having a central section in contact with its respective magnet and side termini flanking said central section, said termini being tapered with both sides of the taper being turned in a direction generally away from said stator relative to the corresponding sides of said central section and over-hanging the area between adjacent magnets, the adjacent termini of adjacent pole pieces being completely separated from each other by non-magnetic material, the portion of each said pole piece between its said termini having an arcuate surface subtending an angle not less than about 55°, and said machine having means providing an apparent internal capacitance sufficient substantially to neutralize the inductive reactance of the machine and to overcome the internal resistance thereof over a substantial portion of the rated operating capacity of the machine.

4. A dynamo-electric machine as set forth in claim 3, wherein said angle is not less than about 60°.

5. A dynamo-electric generator comprising a first member for producing a magnetic flux, a second member reactive to said flux for producing an electric current, one member being located within the other member, means mounting said two members for relative rotation, the juxtaposed surfaces of said two members being substantially cylindrical in over-all configuration, said first member having a plurality of magnetic pole producing means symmetrically spaced circumferentially thereabout, each said means including a pole piece having a central section directly energized magnetically and two side termini flanking said central section, said termini being tapered substantially uniformly away from said central section and both sides of the taper being turned in a direction generally away from said surface of said second member relative to the corresponding sides of said central section, the adjacent termini of adjacent pole pieces being completely separated from each other by non-magnetic material.

6. A dynamo-electric generator as set forth in claim 5, wherein the portion of each said pole piece between its said termini has an arcuate surface subtending an angle not less than about 55°.

7. A dynamo-electric generator as set forth in claim 5, wherein said generator includes means providing an apparent internal capacitive reactance sufficient substantially to neutralize the inductive reactance of the generator and to overcome the internal resistance thereof over a substantial portion of the rated operating capacity of the generator.

8. A permanent magnet dynamo-electric machine, comprising a stator and a cylindrical rotor rotationally mounted within said stator, said rotor comprising a hub having a plurality of side surfaces forming a polygon in cross-section, a permanent magnet of substantially rectangular cross-section mounted on each side surface, and a pole piece capping each said magnet, each pole piece having a central section in contact with its respective magnet and side termini flanking said central section, said termini being tapered with both sides of the taper being turned in a direction generally away from said stator relative to the corresponding sides of said central section and over-hanging the area between adjacent magnets, the adjacent termini of adjacent pole pieces being completely separated from each other by non-magnetic material.

9. A machine as set forth in claim 8, wherein the portion of each said pole piece between its said termini has an arcuate surface subtending an angle not less than about 55°.

10. A machine as set forth in claim 8, wherein said machine includes means providing an apparent internal capacitance sufficient substantially to neutralize the inductive reactance of the machine and to overcome the internal resistance thereof over a substantial portion of the rated capacity of the machine.

11. A machine as set forth in claim 8, wherein said cross-section polygon is a rectangle.

12. A permanent magnet rotor for a dynamo-electric machine comprising a hub having a plurality of permanent magnet pole producing means symmetrically spaced circumferentially thereabout, each said means including a pole piece having a central section and two side termini flanking said central section, said termini being tapered substantially uniformly away from said central section and both sides of the taper being turned in a direction generally toward said hub relative to said central section, and the adjacent termini of adjacent pole pieces being completely separated from each other by non-magnetic material.

13. A permanent magnet rotor as set forth in claim 12, wherein said permanent magnet pole producing means are four in number.

References Cited

UNITED STATES PATENTS

| | | | |
|---|---|---|---|
| 2,449,506 | 9/1948 | Pollard | 322—51 X |
| 2,493,102 | 1/1950 | Brainard | 310—156 |
| 2,637,825 | 5/1953 | Moore | 310—156 |
| 2,703,849 | 3/1955 | Worth | 310—156 |
| 2,779,885 | 1/1957 | Reynst et al. | 310—152 |
| 2,863,077 | 12/1958 | Morrill | 310—156 |

DAVID X. SLINEY, *Primary Examiner.*

U.S. Cl. X.R.

310—111